United States Patent [19]

Marcantonio

[11] Patent Number: 5,479,572
[45] Date of Patent: Dec. 26, 1995

[54] ARTIFICIAL NEURAL NETWORK (ANN) CLASSIFIER APPARATUS FOR SELECTING RELATED COMPUTER ROUTINES AND METHODS

[75] Inventor: Angelo R. Marcantonio, Princeton, N.J.

[73] Assignee: Siemens Corporate Research, Inc., Princeton, N.J.

[21] Appl. No.: 899,808

[22] Filed: Jun. 17, 1992

[51] Int. Cl.[6] .............................. G06F 9/00; G06F 15/46
[52] U.S. Cl. ................................ 395/22; 395/24; 395/27
[58] Field of Search ................................ 395/22, 24, 27; 364/200

[56] References Cited

U.S. PATENT DOCUMENTS

| | | | |
|---|---|---|---|
| 4,964,032 | 10/1990 | Smith | 364/200 |
| 5,001,631 | 3/1991 | Castelaz | 395/22 |
| 5,052,043 | 9/1991 | Gaborski | 395/22 |
| 5,107,454 | 4/1992 | Niki | 395/24 |
| 5,170,463 | 12/1992 | Fujimoto et al. | 395/24 |
| 5,175,796 | 12/1992 | Refregier et al. | 395/22 |
| 5,239,594 | 8/1993 | Yoda | 395/24 |
| 5,247,584 | 9/1993 | Krogmann | 395/21 |
| 5,274,743 | 12/1993 | Imondi et al. | 395/22 |

OTHER PUBLICATIONS

Lin et al, "Microprocessors", The Institute of Electrical and Electronic Engineers, Inc., IEEE 1977.
Lippmann et al, "Pattern Classification Using Neural Networks", IEEE Communication Magazine, Nov. 1989.
"Networks for Approximation and Learning", *Proceedings of the IEEE*, vol. 78, No. 9, Sep. 1990, pp. 1481–1497.
"30 Years of Adaptive Neural Networks: Perceptron, Madaline, & Backpropagation", Widrow et al., *Proceedings of the IEEE*, vol. 78, No. 9, Sep. 1990, pp. 1415–1442.
"The ART of Adaptive Pattern Recognition by a Self–Organizing Neural Network", Carpenter et al., *Computer*, Mar. 1988, pp. 77–88.
"An Optimal Self–Organizing Pattern Classifier", Mekkaoui et al., *Proceedings of the Int'l Joint Conference on Neural Networks*, vol. I, Jan. 15–19, 1990, Washington, D.C., pp. 447–450.
"A New Approach to Clustering", Wilson et al., *Pattern Recognition*, vol. 23 No. 12, pp. 1413–1425, 1990.
"Counterpropagation Networks", Hecht–Nielsen, *IEEE First Int'l Conference on Neural Networks*, vol. II, Jun. 21–24, 1987, San Diego, Calif., pp. 19–32.
"A deterministic annealing approach to clustering", Rose et al. *Pattern Recognition Letters*, Sep. 1990, pp. 589–594.
"Self–Organization and Associative Memory", Kohonen, *Springer–Verlag*, 3rd ed. Berlin, Heidelberg, Germany, 1989, pp. 68–81.
"Spectral Clustering with Neural Networks for Application to Multispectral Remote Sensing of Minerals", Breitkopf et al., *Proceedings of the First Annual INNS Meeting*, Boston, Mass., Sep. 6–10, 1988, p. 14.
"Fish Detection and Classification Using a Neural–Network Based Active Sonar System–Preliminary Results", Ramani et al, *Proceedings of the International Joint Conference on Neural Networks*, vol. II, Washington, D.C., Jan. 15–19, 1990, pp. 527–530.
"Learned Classification of Sonar Targets Using a Massively Parallel Network", Gorman et al., *IEEE Transactions on Acoustics, Speech, and Signal Processing*, vol. 36, No. 7, Jul. 1988, pp. 1135–1140.
"Radar Signal Categorization Using a Neural Network", Anderson et al., *Proceedings of the IEEE*, vol. 78, No. 10, Oct. 1990, pp. 1646–1657.

*Primary Examiner*—George B. Davis
*Attorney, Agent, or Firm*—Adel A. Ahmed

[57] ABSTRACT

An artificial neural network (ANN) classifier provides a series of outputs indicative of a series of classes to which input feature vectors are classified. The ANN provides only one output for each input feature vector to partition said input into one class. The one output of the classifier is coupled to the interrupt input of an associated digital computer or CPU. Upon receipt of the output, the CPU immediately interrupts a main program and executes an interrupt service routine which is triggered by the output of the classifier. In this manner, the CPU is immediately accessed in the interrupt mode by the transition of one of the output class processing elements when activated.

18 Claims, 3 Drawing Sheets

ARTIFICIAL NEURAL NETWORK (ANN) CLASSIFIER APPARATUS FOR SELECTING RELATED COMPUTER ROUTINES AND METHODS

FIELD OF THE INVENTION

This invention relates to artificial neural network (ANN) classifiers and more particularly to apparatus and a method which enables the rapid selection and execution of an interrupt service routine in a processor operating in conjunction with the output of an ANN classifier.

BACKGROUND OF THE INVENTION

Today the term neural network or, more properly, artificial neural network (ANN), has come to mean any computing architecture that consists of massively parallel interconnection of simple "neural" processors. Neural networks are used in pattern classification by defining non-linear regions in the feature space. While neural networks are relatively new in regard to operation, they have been investigated by researchers for many years. For example, see The Proceedings Of The IEEE, September 1990, Special Issue on Neural Networks, Vol. 8, No. 9, pp. 1409–1544. Thus, neural networks of many different types of configurations and uses are well known.

The basic building block used in many neural networks is the adaptive linear element or Adaline. This is an adaptive threshold logic element which comprises an adaptive linear combiner cascaded with a hard limiting quantizer which is used to produce a binary output. In single element neural elements an adaptive algorithm is often used to adjust the weights of the Adaline so that it responds correctly to as many patterns as possible in a training set that has binary desired responses. Once the weights are adjusted, the responses of the trained element can be tested by applying various input patterns. If the Adaline responds correctly with high probability to input patterns that were not included in the training set, it is said that generalization has taken place. Thus, learning and generalization are among the most useful attributes of Adalines in neural networks. A single Adaline is capable of realizing only a small subset of certain logic functions known as the linearly separable logic functions or threshold logic functions. These are the set of logic functions that can be obtained with all possible weight variations. Thus, such classifiers are sometimes referred to as linear classifiers. The linear classifier is limited in its capacity and is limited to only linearly separable forms of pattern discrimination.

More sophisticated classifiers with higher capacities are non-linear. There are two types of non-linear classifiers which are known in the art. The first is a fixed preprocessing network connected to a single adaptive element and the other is the multi-element feed forward neural network. These networks, as well as operations and configurations are known in the prior art and are described, for example, in the above- noted publication in an article entitled "Thirty Years of Adaptive Neural Networks: Perception, Madaline, and Backpropagation" by Bernard Widrow et al. in *Proceedings of the IEEE*, Vol. 78, No. 9, September, 1990, pp. 1415–1441. The article, besides describing the history of neural networks as of the publication date, also has an extensive bibliography in regard to the same.

It is thus apparent that classification, which effects the partitioning of items into separate groups of similar members, is performed using several different artificial neural network (ANN) classifiers. Thus, there exist many prior art publications which show such classifiers. See, for example, the following references:

G. A. Carpenter and S. Grossberg, "The ART of Adaptive Pattern Recognition by a Self-Organizing Neural Network" *Computer*, pp 77– 88, March, 1988.

A. Mekkaoui and P. Jespers, "An Optimal Self-Organizing Pattern Classifier", *Proceedings of the International Joint Conference on Neural Networks*, Vol. I, pp. 447–450, Washington, D.C., Jan. 15–19, 1990.

R. Wilson and M. Spann, "A New Approach To Clustering" *Pattern Recognition*, Vol 23, No. 12, pp. 1413–1425, 1990.

R. Hecht-Nielsen, "Counter-Propagation Networks" *IEEE First International Conference on Neural Networks*, Volume II, pp. 19–32.

K. Rose, E. Gurewitz, and G. Fox, "A Deterministic Annealing Approach to Clustering" *Pattern Recognition Letters*, pp. 589–594, September, 1990.

T. Kohonen, "Self-Organization and Associative Memory" *Springer-Verlag*, 3rd ed Berlin, Heidelberg, Germany, 1989.

These all pertain to different types of artificial neural network classifiers for different purposes. Applications of artificial neural network base classification include the spectral clustering of minerals, as shown for example in the following publication:

P. Breitoph and R. Walker, "Spectral Clustering With Neural Networks for Application to Multispectral Remote Sensing of Minerals", *Proceedings of the First Annual INNS Meeting*, Boston, 1988

Other prior art use ANNS for the classification of fish and sonar targets, as disclosed in the following two references:

R. Namani, P. H. Patrick, W. G. Hanson and H. Anderson, "Fish Detection and Classification Using a Neural-Network—Based Active Sonar System—Preliminary Results", *Proceedings of the International Joint Conference on Neural Networks*, Vol. II, pp. 527–530, Washington, D.C., Jan. 15–19, 1990.

R. Gorman and T. Sejnowski, "Learned Classification of Sonar Targets Using a Massively Parallel Network", *IEEE Transactions on Acoustics, Speech, and Signal Processing*, Vol. ASSP-36, pp. 1135–1140, 1988.

See also the Proceedings of the IEEE, October, 1990, Vol. 78, No. 10, which is a special issue on neural networks as is the above issue and which also has articles showing radar signal categorization using a neural network by James A. Anderson, et al., on p. 1646. Thus, as one can ascertain, there are a number of different neural network configurations which are operated as classifiers and such classifiers are well known.

The classifier essentially receives a feature set at a plurality of inputs where each of the inputs is directed to individual processing elements which comprise the neural network. The feature sets are then partitioned into separate classes which appear at the outputs. As will be explained, ANN classifiers may also determine that a separate course of action be undertaken depending upon which output class is selected by the ANN classifier. In this manner, such a classifier is intimately associated with a processor which, as will be explained, enables the system, including the ANN, to provide meaningful data and to further process the data or operate on the data, according to the output class.

In order to use the process, which can be accessed randomly, depending upon the classifier's operation, a great deal of time is usually required. Many processors are absolutely dedicated to the sole task of processing the outputs from the neural network and cannot be used for other routines.

It is therefore an object of the present invention to provide apparatus and a method which enables the output class firing of an ANN classifier to rapidly trigger the execution of the appropriate computer routine by using the rising edge, zero to one transition, of the ANN output as the interrupt input to a digital computer.

SUMMARY OF THE INVENTION

In an artificial neural network (ANN) classifier system having n processing output terminals indicative of n classes, with one of said class output terminals activated for a given set of feature input vectors associated with that class, said system including a computer capable of implementing a separate subroutine as a function of said activated output class and said computer having at least one interrupt input terminal, in combination therewith, apparatus for accessing said computer interrupt comprising means coupled to said class output terminals and to said interrupt input and operative to energize said interrupt input upon activation of one of said n processing terminals for causing said computer to provide said subroutine according to which one of said n output terminals is activated.

BRIEF DESCRIPTION OF THE FIGURES

For a better understanding of the present invention, reference is made to the following description of an exemplary embodiment thereof, considered in conjunction with the accompanying drawings, in which.

DETAILED DESCRIPTION OF THE FIGURES

Figure 1:
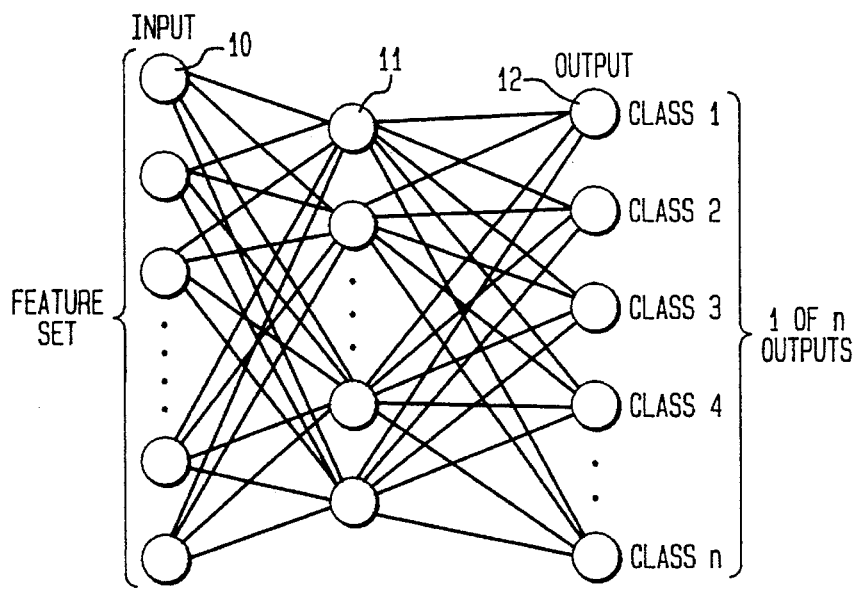
FIG. 1 is a general block diagram depicting an artificial neural network (ANN) classifier according to this invention.

Referring to FIG. 1, there is shown a block diagram of a typical artificial neural network or ANN as it may appear when applied to a classification problem. As seen, each of the modules referenced by numerals 10, 11 and 12 and the remaining modules pertain to processing elements which appear in the system. The connections between the modules represent the connection weights, as is well known. Thus, for example, each of the modules 10, 11 and 12 may represent first layer Adalines or second layer or third layer Adalines with each of the output stages, such as 12, representing output layer Adalines or Madalines. A Madaline, as is well known, is a trainable layered neural network with multiple adaptive elements, many examples of which are well known.

As one can see, relevant characteristics of the items to be classified are selected as the feature set and applied to the input processing elements and are used to train the classifier by presenting them as vectors to the network input. Thus, the feature set is applied to the input processing elements, such as module 10, and is directed through the network to the output processing elements 12. Thus, each of the elements associated with the feature sets is then classified in classes as Class 1 to Class n. As indicated, the input feature set after processing provides one class output of the ANN as one of n outputs. Thus, once trained, the ANN classifier is utilized to classify an unknown item by sensing the feature vector corresponding to the item at the input of the ANN and setting its output. The output vector, which is of dimension n, will have n–1 of its outputs set to zero with a single output set to 1. That output, which is set to 1, is the output node pertaining to the unknown input item's class. This is essentially how a classifier works.

In all but the simplest applications of ANN classifiers, each firing class determines that a separate course of action be undertaken, often involving operations on a digital computer. For example, an ANN classifier, as shown in FIG. 1, may be used in a medical diagnosis of some physical ailment based on patient symptoms. Thus, depending on the symptoms which are essentially the feature set inputted, an output may decide on the diagnostic category, call for surgery, request for more data, or to prescribe medication. Each of these output classes require a completely different action. The request for more data may trigger a routine in the computer that requires that certain questions be answered; while the class output suggesting medication may trigger another routine which lists appropriate medications for that ailment. The ability of a classifier to operate as such and to provide an output indicative of the class as shown in FIG. 1 enables that output to couple to a processor to enable the processor to further perform routines which essentially determine the further steps to be taken, depending upon the output class which is activated. Additional input or output information derived from the feature set may also be inputted to the computer or processor.

Figure 2:
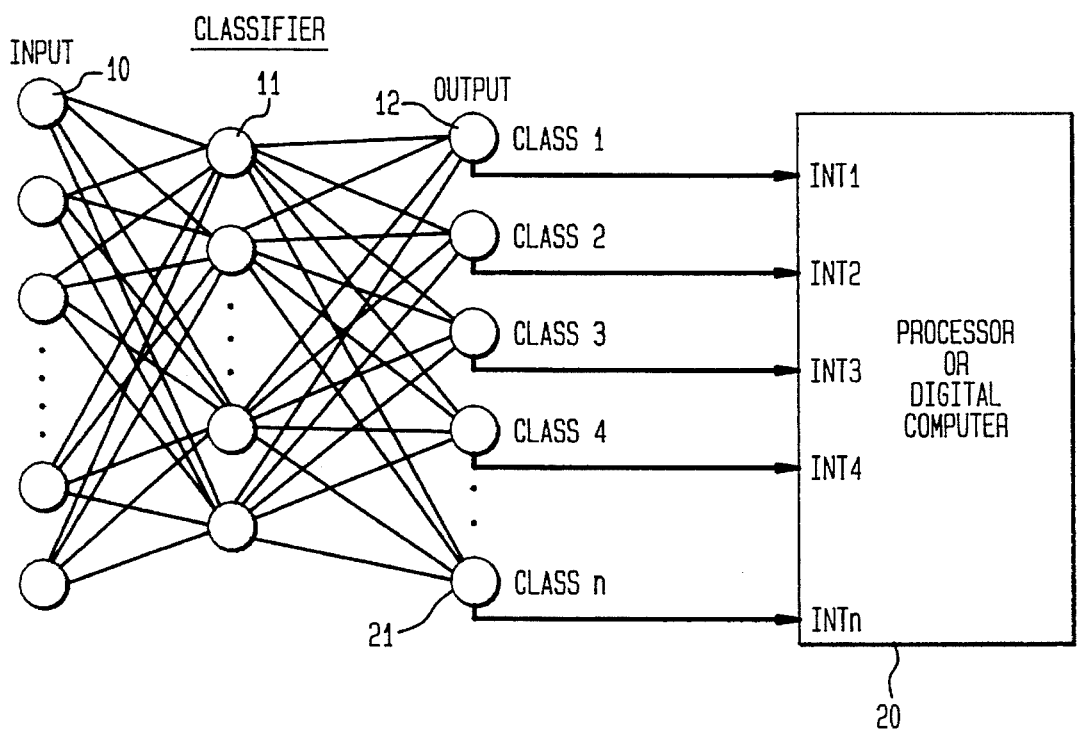
FIG. 2 is a block diagram showing an ANN coupled to a processor or digital computer according to this invention.

Referring to FIG. 2, there is shown a classifier which essentially has a series of input processing elements 10 as that shown in FIG. 1 where the outputs of the class modules, 12 through 21 are each directed to a separate interrupt input (Intl to Intn) of a processor 20. Thus, as seen in FIG. 2, each of the outputs of the ANN classifier designated as Class 1 to Class n is connected to a separate interrupt input of the computer or processor 20. The output from module 12 designated as Class 1 is connected to the interrupt input number Intl of processor 20. In a similar manner, the module designated as 21 for Class n is connected to the interrupt input Intn of the processor 20. In the case of FIG. 2, each interrupt input corresponds to a separate routine start address which is provided by the processor 20.

As will be explained, the present invention relates to the apparatus and method which enables the output class firing of the ANN classifier to rapidly trigger the execution of the appropriate computer or processor routine by using the rising edge, zero to one transition, of the ANN output as the interrupt input to the digital computer. The interrupt input of a digital computer or processor 20 provides real time servicing of external asynchronous events when activated by causing an interruption in the sequence of the executing program and a jump to the start address of the interrupt routine corresponding to the event which caused the interrupt.

Interrupts, as available for example in a processor or digital computer 20 are well known. Generally an interrupt is a signal generated by an interface or peripheral such as the ANN to force the processor 20 to undertake immediate service when the peripheral or ANN must have quick service. Thus, most processors have interrupt lines which are directed strictly to the processor. These can be set up as flag lines presenting information about the status of a peripheral device to the processor, or they can be used as interrupts which demand the immediate attention of the processor. Thus, interrupt operation in computers is well known, as well as various techniques for implementing the same.

Most modern day microprocessors make some form of interrupt capacity immediately available. For example, some processors just give the user a general interrupt signal to work with that is sufficient for most purposes. Other processors, such as the Intel 8008 use a single interrupt line but offer an elaborate capability. The user can code three bits which allow him to reach specified main memory locations. The idea is to store the first instruction of an appropriate interrupt handling the routine at these locations. With three binary bits, up to eight different interrupt routines can be addressed by a microprocessor. The capability is sometimes called a vector interrupt.

Other processors which are available, such as the Motorola M6800, provides two interrupt lines and the Toshiba TLCS-12 processor has eight independent interrupt lines with a hardware implemented priority scheme. Thus, interrupts are well known and available in most processors.

As seen in FIG. 2, the processor 20 has a plurality of interrupt lines as explained, each of which is associated with a separate class output from the classifier and each of which can therefore implement a separate interrupt routine depending upon the class output. For examples of a wide host of interrupt capabilities, see a text entitled "Microprocessors" edited by Wen C. Lin, published by the IEEE Press, The Institute of Electrical and Electronic Engineers, Inc., (1977), catalogue No. 76-53223. This text has a host of examples regarding various interrupt signals and the execution of various programs in conjunction with such interrupts.

Figure 3:
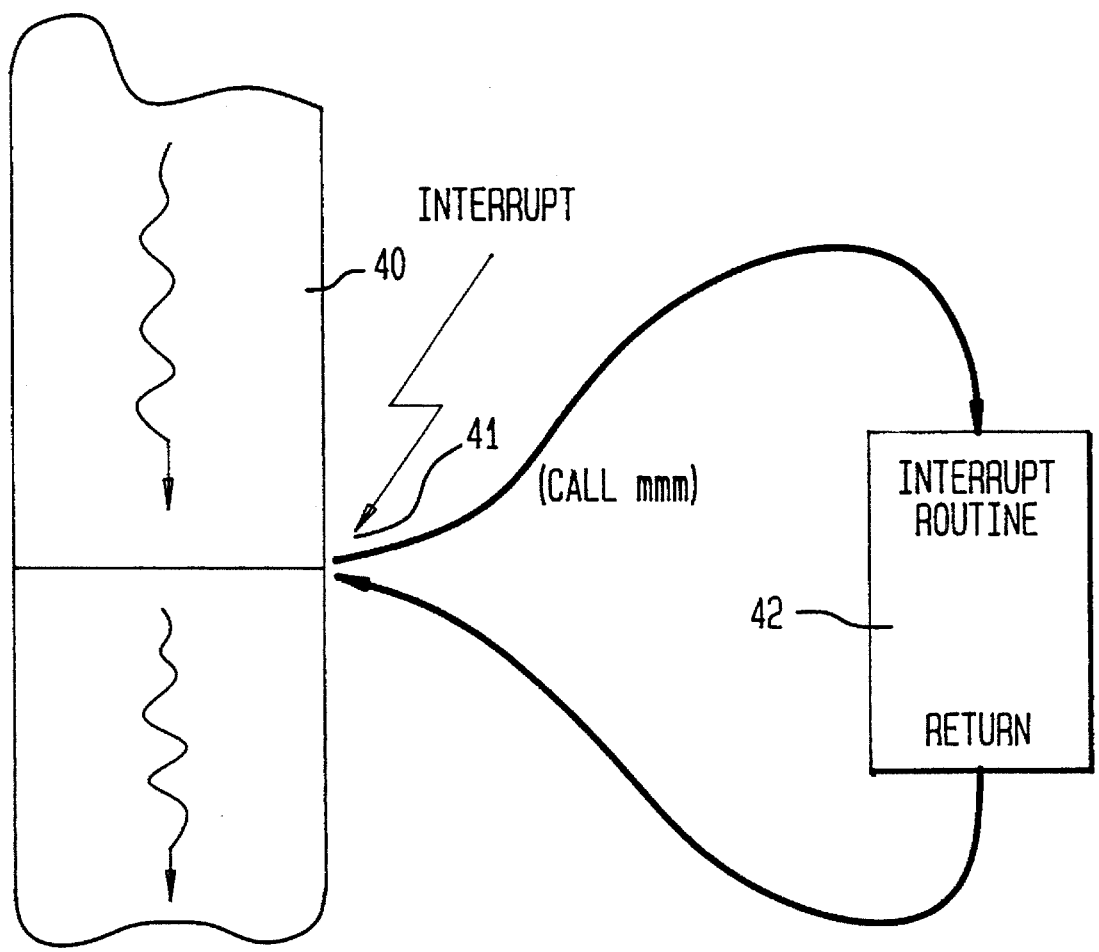
FIG. 3 is a flow chart depicting a high level view of an interrupt service flow according to this invention.

Referring to FIG. 3, there is shown a very simple high level view of the interrupt service flow. In FIG. 3 it is shown that a main program designated by reference numeral 40 is being run. The processor, or digital computer executing the main program, receives the interrupt signal at the interrupt input to the computer. The interrupt signal indicated by reference numeral 41 provides real time servicing of the external asynchronous event when activated. As seen, the initiation of the interrupt signal 41 immediately accesses a hardware subroutine indicated in FIG. 3 as "CALL mmm" where mmm is the starting address of that routine that executes the pass required by the interrupt. Thus, once the interrupt 41 is generated, the subroutine is entered into, which causes the interrupt routine 42 to be executed. Once the interrupt routine is executed then one returns to the main program, as shown in FIG. 3.

Figure 4:
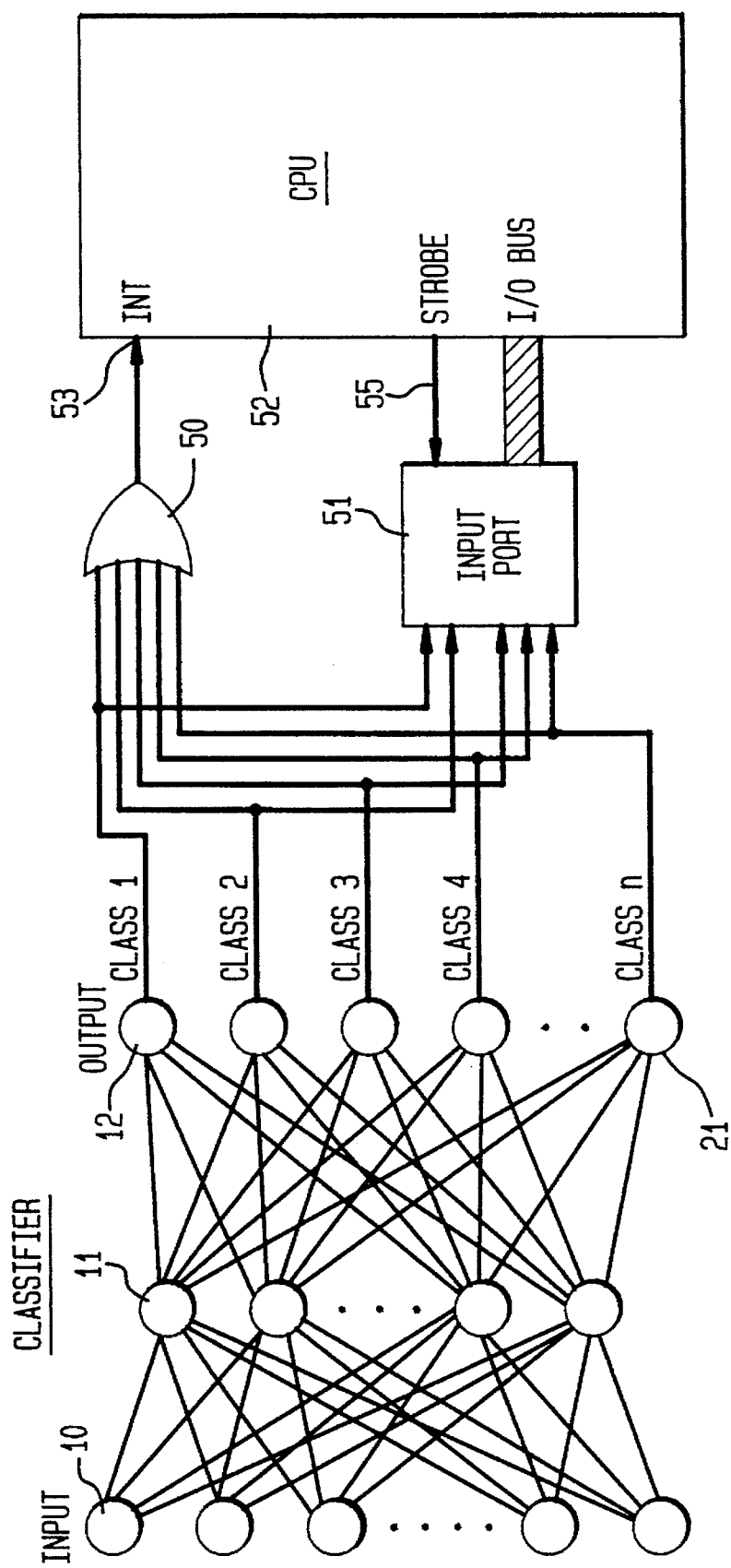
FIG. 4 is a block diagram depicting an ANN classifier coupled to a CPU which has a single interrupt line and which classifier provides a plurality of output class processing elements.

Referring to FIG. 4 there is shown another form of the invention where only a single processor interrupt which is available at the CPU terminal 53 is shown. Here the processor interrupt request is generated by OR gate 50 with essentially each separate input coupled to a respective output class processor, as for example processor 12 and 21. The OR gate 50 has the output connected directly to the interrupt terminal designated as Int of the CPU 52. Also shown is module 51 whereby module 51 has each of its inputs coupled to an associated output class processing element such as 12 and 21. The module 51 is coupled directly to the I/O bus of the CPU 52. In this manner, the CPU 52 upon receiving an interrupt request on line 53 then outputs a strobe via line 55. The strobe activates the input port module 51. Identification of the interrupting line may then be carried out by causing the processor or CPU 52 to then read the output of that line or the output of the output classifier once the interrupt probe is received.

As indicated above, one of the output processing elements will produce an output for the various feature inputs. In this manner, the feature inputs provide only one class output. Upon producing an output, only one of the class processors will be activated. This one class processor causes gate 50 to produce a pulse based on a transition from 1 to 0 or from 0 to 1 on the interrupt input 53. Thus, once the interrupt is produced, the CPU then strobes the input port which again knows exactly which output was provided because of the fact that the input port module 51 also receives all the outputs. In this manner this information regarding the class module is sent on the I/O bus to the CPU 52 which then performs a suitable subroutine or routine, depending upon the class activated.

Identification of the interrupting line may be then carried out by the processor read of the n lines and this can be accomplished either by the CPU memory or strictly from the I/O bus. The binary value of these n lines, which are the output class lines, may then be used directly to form a portion of the corresponding interrupt vector or may be used as an index to perform a table look up which accesses a complete callable machine address of the service routine. For example, if n equals 4, as for example 4 classifier outputs, then the classifier outputs may be 0001, 0010, 0100, or 1000 depending on which class is selected. Once read into the processing unit, logical operations placing these values into address field bits 8, 9, 10 and 11 effectively creates 16 bit vector addresses of x100, x200, x400, and x800 hexadecimal respectively. Essentially, as one can understand, the above provides apparatus and a method which enables the rapid selection and execution of an interrupt service routine triggered directly by the corresponding one of n class outputs of an ANN classifier. Thus, as one can ascertain, the invention enables the output class firing of the ANN classifier to rapidly trigger the execution of the appropriate computer routine by using the rising edge or trailing edge, as for example a 0 to 1 transition of the ANN output, as the interrupt input to a computer. It is apparent to one skilled in the art that the various subroutines for performing with classifiers would be dependent upon the nature or type of classifier and in any typical subroutines that may be employed with ANN classifiers of all types are known.

For example, in the case of the above-referenced neural network classifier which classifies minerals, it can be seen that depending upon the output of each of the class modules, such as 12 and 21, if a certain mineral is detected then one may access another subroutine to determine, for example, the purity of the mineral to indicate the nature of the mineral and so on. It is further understood that the system including the CPU knows the class output from the ANN and therefore can provide a subroutine when the interrupt is activated. The CPU can also receive additional input or output data from the ANN indicative of the class outputted to assist in subroutine execution.

As one can understand, the invention has great applicability but the essence of the invention is quite general in its applicability and can be used in a wide variety of neural network classifier implementations. The nature of the invention is an apparatus and method which enables the output class firing of an ANN classifier to enable an associated computer to operate a routine upon receipt of an output from the one of n output processing elements of the classifier.

What is claimed is:

1. In an artificial neural network (ANN) classifier system having n class output terminals comprising n processing output terminals indicative of n classes, with one of said class output terminals activated for a given set of feature input vectors associated with that class, said system including a computer capable of implementing a predetermined subroutine as a function of an activated output class and said computer having at least one interrupt input terminal, in combination therewith apparatus for accessing said computer, comprising:

means coupled to said class output terminals and to said interrupt input and operative to energize said interrupt input terminal upon activation of one of said n processing output terminals for causing said computer to provide a subroutine according to which one of said n class output terminals is activated.

2. The artificial neural network (ANN) classifier according to claim 1 wherein said computer has an interrupt terminal for each of said n processing output terminals, whereby each of said n processing output terminals is coupled to a separate associated interrupt terminal of said computer.

3. The artificial neural network (ANN) classifier according to claim 1 wherein said computer is a microprocessor.

4. The artificial neural network (ANN) classifier according to claim 1 wherein said means includes a logic gate having n input terminals, with each terminal coupled to an associated one of said processing output terminals to provide at an output of said logic gate a control signal when any one of said processing output terminals is activated, said output terminal of said gate coupled to said at least one interrupt input terminal of said computer and means coupled to said n output processing terminals and responsive to said computer receiving said control signal to inform said computer of which class was activated by said ANN classifier to thereby enable said computer to perform a subroutine according to said activated output class.

5. The artificial neural network (ANN) classifier according to claim 4 wherein said logic gate is an OR gate.

6. The artificial neural network (ANN) classifier according to claim 5 further including means coupling said n processing output terminals to an I/O bus of said computer.

7. The artificial neural network (ANN) classifier according to claim 1 wherein said ANN classifier is a linear classifier.

8. The artificial neural network (ANN) classifier according to claim 1 wherein said ANN classifier is a nonlinear classifier.

9. The artificial neural network (ANN) classifier according to claim 1 wherein said interrupt input said computer is activated by a rising edge transition from one of said n processing output terminals.

10. The artificial neural network (ANN) classifier according to claim 1 wherein when said interrupt input is energized, said computer executes a jump to a start address of an interrupt service routine associated with said activated output class.

11. A method for causing a computer having an interrupt terminal to perform an interrupt subroutine when said interrupt terminal is activated, said interrupt subroutine being indicative of an output class partitioned by an ANN classifier having a plurality of separate class processing outputs indicative of n classes where each class is indicative of a separate group of similar members, comprising of steps of:

activating said interrupt terminal of said computer when said ANN classifier provides a class output by a activating one of said separate class processing outputs; and causing said computer to execute a subroutine according to said class output after activating said interrupt terminal.

12. The method according to claim 11 wherein said computer has at least one interrupt terminal.

13. The method according to claim 11 wherein said computer has one interrupt terminal for each class output of said ANN classifier with each interrupt terminal when activated enabling said computer to execute a subroutine associated with said interrupt terminal.

14. The method according to claim 11 wherein said computer has a single interrupt terminal and including the steps of:

ORing all of said class processing outputs to provide a single output control signal; and applying said output control signal to said interrupt terminal.

15. The method according to claim 11 wherein said computer is a microprocessor.

16. The method according to claim 11 further including the step of:

detecting a transition at one of said class processing outputs; and activating said interrupt terminal upon detecting said transition.

17. The method according to claim 16 wherein said transition is from a zero level to a binary one level.

18. The method according to claim 16 wherein said transition is from a binary one level to a zero level.

* * * * *